(12) United States Patent
Iwane

(10) Patent No.: US 8,537,261 B2
(45) Date of Patent: Sep. 17, 2013

(54) IMAGE-CAPTURING APPARATUS AND COMPUTER-READABLE COMPUTER PROGRAM PRODUCT CONTAINING IMAGE ANALYSIS COMPUTER PROGRAM

(75) Inventor: Toru Iwane, Yokohama (JP)

(73) Assignee: Nikon Corporation, Tokyo (JP)

( * ) Notice: Subject to any disclaimer, the term of this patent is extended or adjusted under 35 U.S.C. 154(b) by 233 days.

(21) Appl. No.: 12/911,194

(22) Filed: Oct. 25, 2010

(65) Prior Publication Data

US 2011/0228131 A1    Sep. 22, 2011

(30) Foreign Application Priority Data

Oct. 27, 2009   (JP) ................................ 2009-246881

(51) Int. Cl.
  *H04N 5/225*  (2006.01)
  *G02B 13/16*  (2006.01)
(52) U.S. Cl.
  USPC .................. 348/335; 348/222.1; 348/345
(58) Field of Classification Search
  USPC ................ 348/335, 340, 222.1, 345
  See application file for complete search history.

(56) References Cited

U.S. PATENT DOCUMENTS

| 2007/0206241 A1* | 9/2007 | Smith et al. ............. 358/505 |
| 2007/0252074 A1 | 11/2007 | Ng et al. |
| 2009/0214107 A1* | 8/2009 | Masuda ................... 382/154 |
| 2009/0295829 A1* | 12/2009 | Georgiev et al. ........ 348/335 |

FOREIGN PATENT DOCUMENTS

| JP | A-1-216306 | 8/1989 |
| JP | A-9-102039 | 4/1997 |
| JP | A-2004-4471 | 1/2007 |
| JP | A-2007-4471 | 1/2007 |
| JP | A-2009-177728 | 8/2009 |

OTHER PUBLICATIONS

Ng et al., "Light Field Photography with a Hand-held Plenoptic Camera," Stanford Tech Report, 2005, pp. 1-11.

* cited by examiner

*Primary Examiner* — Gevell Selby
(74) *Attorney, Agent, or Firm* — Oliff & Berridge, PLC

(57) ABSTRACT

An image-capturing apparatus includes: a micro-lens array that includes a plurality of micro-lenses arrayed therein; an image sensor that includes arrayed therein a plurality of pixels that capture a plurality of pupil projection images, each corresponding to a pupil of an optical system projected via one of the plurality of micro-lenses as a light flux from the optical system passes through the micro-lens array; a photographic image generation unit that generates, based upon an output from the image sensor, a photographic image including a partial image corresponding to each of the plurality of pupil projection images; and an arithmetic operation unit that executes position calculation to determine a center position of the partial image by scanning the photographic image in reference to a reference image corresponding to the partial image.

10 Claims, 12 Drawing Sheets

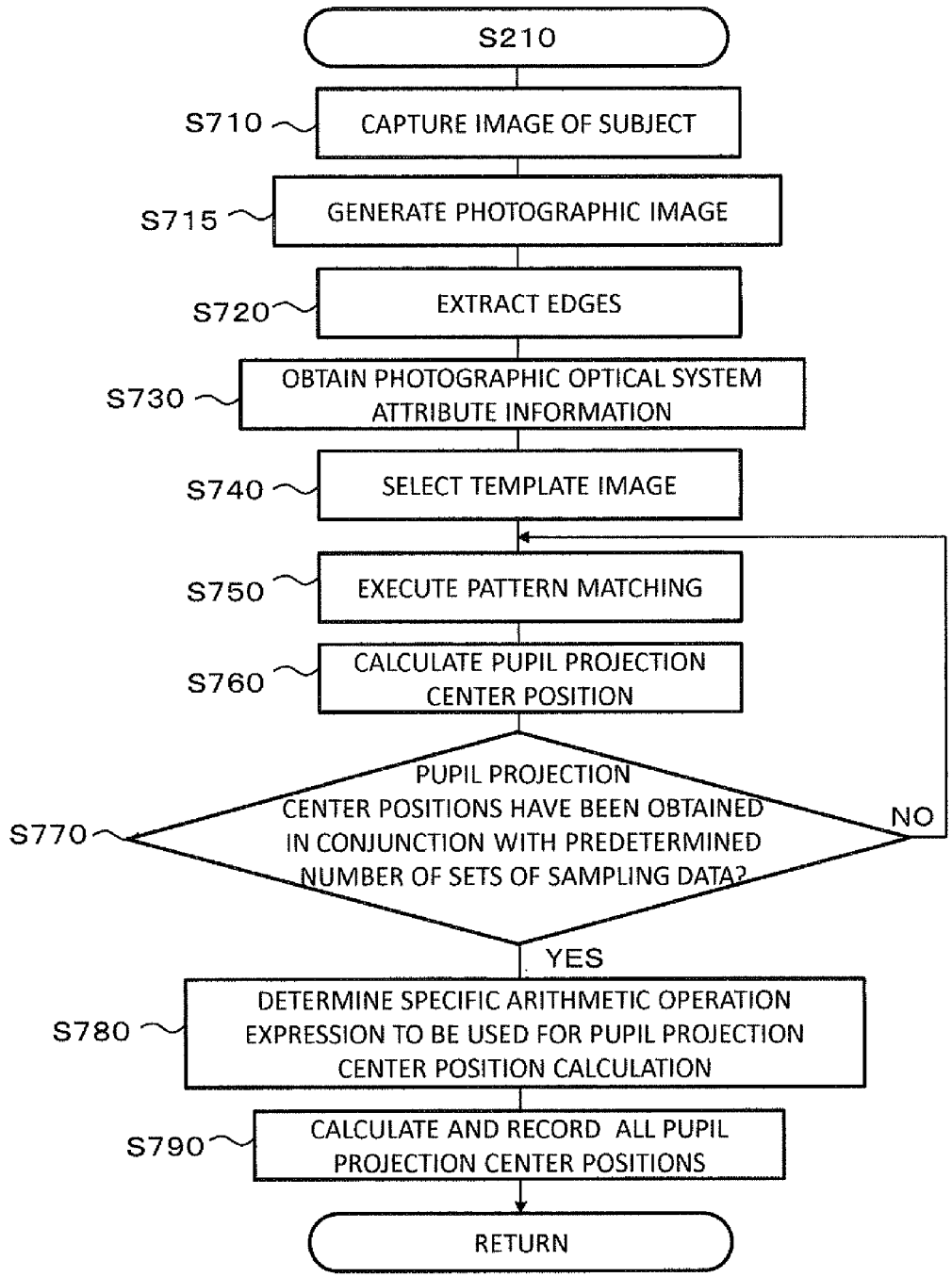

IMAGE-CAPTURING APPARATUS AND COMPUTER-READABLE COMPUTER PROGRAM PRODUCT CONTAINING IMAGE ANALYSIS COMPUTER PROGRAM

INCORPORATION BY REFERENCE

The disclosure of the following priority application is herein incorporated by reference: Japanese Patent Application No. 2009-246881 filed Oct. 27, 2009.

BACKGROUND OF THE INVENTION

1. Field of the Invention

The present invention relates to an image-capturing apparatus and a computer-readable computer program product containing an image analysis computer program.

2. Description of Related Art

An image-capturing apparatus known in the related art may be capable of synthesizing an image achieving focus on a given image plane by using data obtained through a single photographing operation. The image-capturing apparatus disclosed in Japanese Laid Open Patent Publication No. 2007-4471 generates image data based upon the values output from pixels that receive light entering the centers of micro-lenses after passing through a photographic optical system.

SUMMARY OF THE INVENTION

However, a high level of accuracy cannot be assured with image data synthesis processing executed based upon design values by assuming that they each indicate the exact position of a specific pixel to receive a light beam that enters the center of the corresponding micro-lens after passing through the photographic optical systems as described above and an image obtained through such image data synthesis processing may not be in focus. This issue arises from a production-related difficulty in achieving precise alignment of the micro-lens array where the micro-lenses are disposed with respect to the image sensor where the pixels are disposed. In other words, there is an issue yet to be effectively addressed in that the position of a pixel to receive a light beam that enters the center of the corresponding micro-lens after passing through the photographic optical system cannot be determined accurately.

According to the 1st aspect of the present invention, an image-capturing apparatus comprises: a micro-lens array that includes a plurality of micro-lenses arrayed therein; an image sensor that includes arrayed therein a plurality of pixels that capture a plurality of pupil projection images, each corresponding to a pupil of an optical system projected via one of the plurality of micro-lenses as a light flux from the optical system passes through the micro-lens array; a photographic image generation unit that generates, based upon an output from the image sensor, a photographic image including a partial image corresponding to each of the plurality of pupil projection images; and an arithmetic operation unit that executes position calculation to determine a center position of the partial image by scanning the photographic image in reference to a reference image corresponding to the partial image.

According to the 2nd aspect of the present invention, in the image-capturing apparatus according to the 1st aspect, it is preferred that the plurality of micro-lenses includes a first micro-lens and a second micro-lens different from the first micro-lens; the plurality of pupil projection images includes a first projection image corresponding to the first micro-lens and a second projection image corresponding to the second micro-lens; and the arithmetic operation unit determines through the position calculation a first center position of the partial image corresponding to the first projection image and calculates a second center position of the partial image corresponding to the second projection image based upon the first center position and an array arrangement assumed for the plurality of micro-lenses.

According to the 3rd aspect of the present invention, in the image-capturing apparatus according to the 1st aspect, it is preferred that the image-capturing apparatus further comprises: a selecting unit that selects the reference image based upon attribute information indicating attributes of the optical system.

According to the 4th aspect of the present invention, in the image-capturing apparatus according to the 1st aspect, it is preferred that the image-capturing apparatus further comprises a storage unit in which the center position, calculated by the arithmetic operation unit when a pupil position of the pupil of the optical system takes a predetermined value, is stored as a reference position. When the pupil position is altered to assume a value other than the predetermined value, the arithmetic operation unit calculates the center position by using the reference position.

According to the 5th aspect of the present invention, in the image-capturing apparatus according to the 4th aspect, it is preferred that, when the pupil position is altered to assume the value other than the predetermined value, the arithmetic operation unit calculates the center position based upon the value other than the predetermined value as well as the predetermined value.

According to the 6th aspect of the present invention, in the image-capturing apparatus according to the 1st aspect, it is preferred that the image-capturing apparatus further comprises: a image synthesis unit that selects pixels among the plurality of pixels based upon the center position determined through the position calculation and synthesizes a subject image by using outputs from the selected pixels.

According to the 7th aspect of the present invention, in the image-capturing apparatus according to the 1st aspect, it is preferred that the image-capturing apparatus further comprises: a focus detection unit that selects from the plurality of pixels a pair of pixels corresponding to each of the plurality of micro-lenses, at which a pair of images are formed with a pair of light fluxes passing through a pair of pupils of the optical system different from each other, based upon the center position determined through the position calculation, and detects a focusing condition for the optical system based upon outputs from the pair of pixels.

According to the 8th aspect of the present invention, in the image-capturing apparatus according to the 1st aspect, it is preferred that the image-capturing apparatus further comprises: a reference image generation unit that updates, based upon a correlation of the reference image and the photographic image manifesting when a pupil diameter in each of the plurality of pupil projection images corresponding to the attribute information is represented by a provisional value, the pupil diameter with an update value, and generates the reference image in correspondence to the pupil diameter assuming the update value.

According to the 9th aspect of the present invention, a computer-readable computer program product containing an image analysis computer program that enables, in an image-capturing apparatus comprising an optical system, a micro-lens array with a plurality of micro-lenses arrayed therein, and an image sensor with a plurality of pixels arrayed therein, image analysis to be executed in conjunction with image-capturing data generated based upon output from the image sensor, the image analysis computer program comprises: a generation instruction for generating, based upon the image-capturing data, a photographic image including a partial image corresponding to each of a plurality of pupil projection images each corresponding to a pupil of the optical system; and a first arithmetic operation instruction for determining a center position of the partial image by scanning the photographic image in reference to a reference image corresponding to the partial image.

According to the 10th aspect of the present invention, in the computer-readable computer program product according to the 9th aspect, wherein the image analysis computer program further comprises: a second arithmetic operation instruction for calculating, after a first center position of the partial image corresponding to one pupil projection image among the plurality of pupil projection images is determined in response to the first arithmetic operation instruction, a second center position of the partial image corresponding to another pupil projection image among the plurality of pupil projection images based upon the first center position and an array arrangement assumed for the plurality of micro-lenses.

BRIEF DESCRIPTION OF THE DRAWINGS

FIG. 7 presents a detailed flowchart of the processing executed by the main control unit in step S210 in FIG. 2A and FIG. 2B in order to determine the pupil projection center positions.

DESCRIPTION OF PREFERRED EMBODIMENTS

First Embodiment

Figure 1:
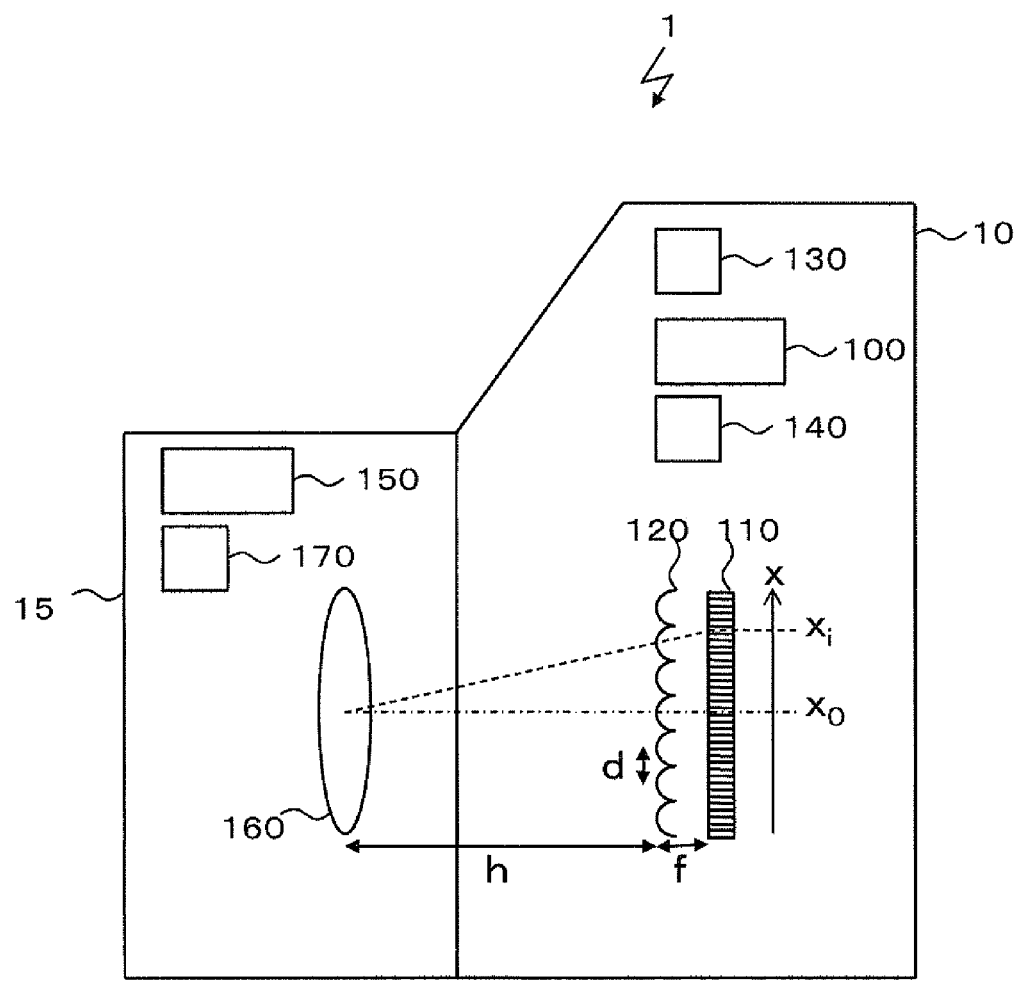
FIG. 1 illustrates the structure of the camera achieved in a first embodiment.

In reference to FIGS. 1 through 10, the first embodiment achieved by adopting the image-capturing apparatus according to the present invention in a camera is described. FIG. 1 illustrates the structure of a camera 1 achieved in the embodiment. The camera 1 in FIG. 1, which includes a camera body 10 and a lens barrel 15, has either a focus detection function or an image synthesis function, or both of these functions. A photographic lens control unit 150, a photographic lens 160 and a lens barrel memory 170 are located at the lens barrel 15. A main control unit 100, an image sensor 110, a micro-lens array 120, an internal memory 130 and a memory card 140 are located at the camera body 10. The photographic lens 160 includes a photographic optical system constituted with a focusing lens, a zooming lens, an aperture and the like.

At the lens barrel 15, the photographic lens control unit 150 executes focus adjustment for the photographic lens 160 by driving the photographic lens 160 and the aperture (not shown) in response to instructions issued by the main control unit 100 in the camera body 10. Design values related to the photographic lens 160, such as the focal length, the maximum aperture number of the photographic lens 160 or the like, are recorded in the lens barrel memory 170.

At the camera body 10, the main control unit 100 executes focus detection for the photographic lens 160, controls the focus adjustment executed by the photographic lens control unit 150 for the photographic lens 160 based upon the focus detection results, generates a photographic image based upon an image sensor output obtained as the image sensor 110 captures an image of a subject, and records the image data expressing the photographic image thus generated into the memory card 140. In addition, it obtains photographic lens attribute information from the photographic lens control unit 150, determines pupil projection center positions through the processing to be described in detail later and records the pupil projection center positions thus determined into the internal memory 130.

In FIG. 1, a distance h between the photographic lens 160 and the micro-lens array 120, i.e., a pupil position h, a pitch d with which the individual micro-lenses constituting the micro-lens array 120 are set side-by-side, and the focal length f of the micro-lenses, are indicated. The focal length f of the micro-lenses is equal to the distance between the micro-lens array 120 and the image sensor 110. Assuming that an x-axis defines the direction along which the longitudinal side or the lateral side of the image sensor extends, a position $x_0$ and a position $x_i$ in FIG. 1 are respectively the position of a pixel that receives a light beam entering the center of a 0th micro-lens closest to the optical axis of the photographic lens 160 and the position of a pixel that receives a light beam entering the center of an ith micro-lens located at the ith position counted from the 0th micro-lens along the x-axis.

Figure 2A:
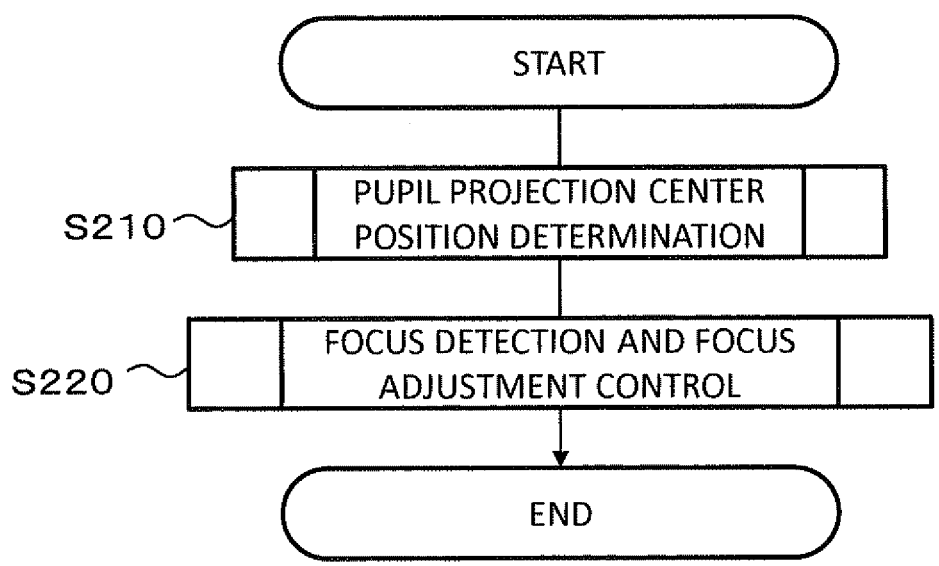
FIGS. 2A and 2B each present a detailed flowchart of an operation executed by the main control unit.
Figure 2B:
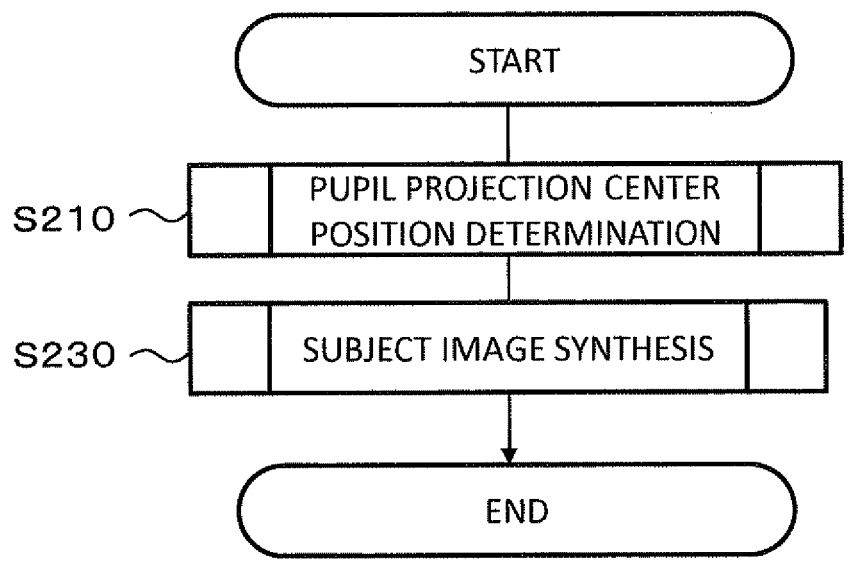

FIGS. 2A and 2B each present a detailed flowchart of an operation that may be executed by the main control unit 100. The main control unit 100 executing the operation shown in FIG. 2A determines pupil projection center positions in step S210. It then executes focus detection for the photographic lens 160 based upon the pupil projection center positions having been determined and controls the focus adjustment executed by the photographic lens control unit 150 for the photographic lens 160 accordingly. The focus detection for the photographic lens 160 and control of the focus adjustment for the photographic lens 160 may be executed by adopting, for instance, the split-pupil phase detection method disclosed in Japanese Laid Open Patent Publication No. H1-216306. In step S230, the main control unit 100 selects a pair of pixels at which a pair of images are formed with a pair of light fluxes passing through two different pupils of the photographic lens 160, among a plurality of pixels on the image sensor 110, in correspondence to each micro-lens based upon the pupil projection center positions having been determined in step S210 and detects the focusing condition for the photographic lens 160 by using the outputs from the pair of pixels thus selected. It is preferable that the pupil projection center positions be immediately determined in step S210, as soon as the user turns on the power to the camera 1 and that the main control unit wait in standby, ready to start the focus detection and the focus adjustment control for the photographic lens 160 in step S220 in response to a user operation.

In the operation in the flowchart presented in FIG. 2B, the main control unit 100 determines the pupil projection center positions in step S210 and then synthesizes an image in step S230 based upon the pupil projection center positions having been determined. An image may be synthetically generated in step S230 by adopting, for instance, the art disclosed in Japanese Laid Open Patent Publication No. 2007-4471. In step S230, the main control unit 100 selects pixels that correspond to the subject image forming position, among the plurality of pixels disposed on the image sensor 110, each in correspondence to a given micro-lens, based upon the pupil projection center positions having been determined in step S210, and synthetically generates a subject image by using the outputs from these selected pixels. It is preferable that the pupil projection center positions be determined in step S210 repeatedly over fixed intervals while a live-view image display is up at a monitor (not shown) of the camera 1 as the main control unit waits in standby, ready to start synthesizing an image in step S230. The following is a detailed description of the pupil projection center position determining processing.

Figure 3:
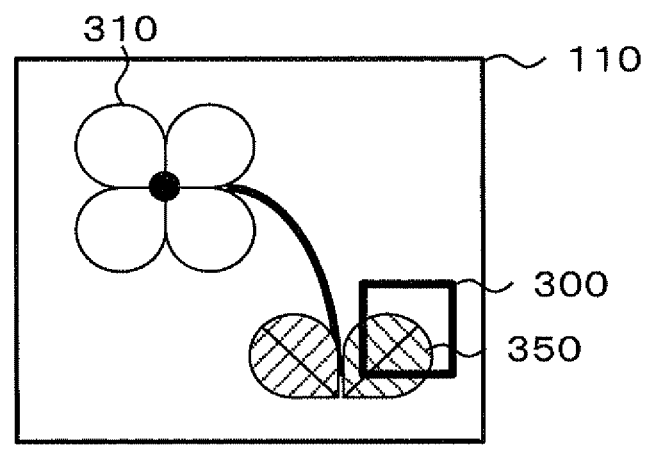
FIG. 3 is a front view of the image sensor onto which a subject image is projected.

FIG. 3 is a front view of the image sensor 110, onto which a subject image 310 of a plant, chosen as an image-capturing target subject, is projected. The figure does not illustrate the individual pixels. A further description is provided by focusing on a partial area 300 of the image sensor 110, which contains an image 350 of part of a leaf of the plant.

Figure 4:
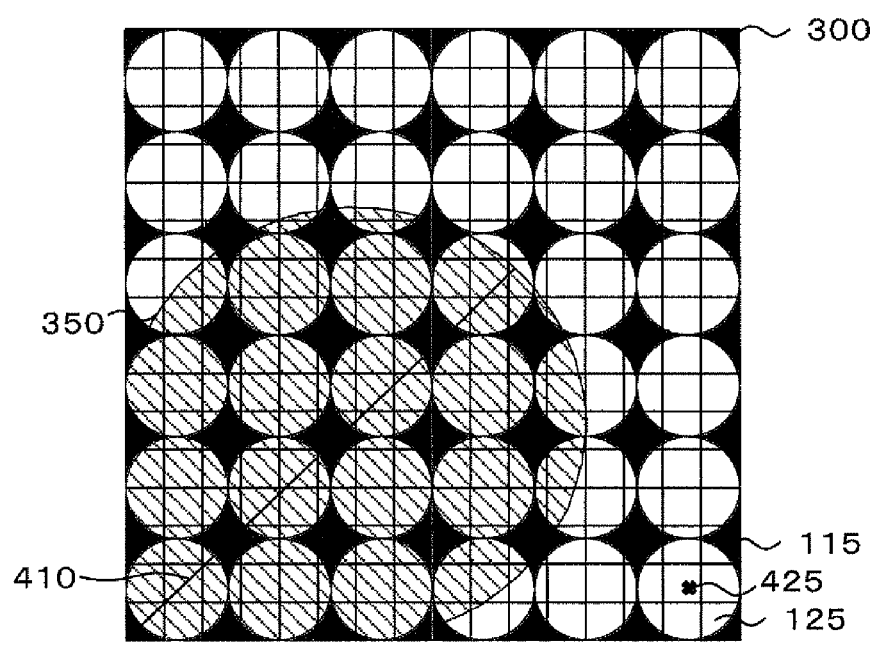
FIG. 4 is an enlarged view of a partial area constituting part of the image sensor.

FIG. 4 is an enlarged view of the partial area 300 of the image sensor 110, in which the image 350 of part of the leaf of the plant, i.e., the photographic subject in FIG. 3, is formed. Square image-capturing pixels 115 are disposed next to one another over the area 300 at the image sensor 110. In addition, each unfilled circular area is a projection image 125 of a pupil of the photographic lens 160, projected onto the light receiving surface of the image sensor 110 with a light flux entering a micro-lens after passing through the photographic lens 160. A pupil projection center position 425 is taken at the center of each pupil projection image. The pupil projection images 125 in the area outside the image 350 of part of the leaf, which is hatched in FIG. 4, assume high intensity values and are thus clear. However, the pupil projection images 125 in the area inside the image 350 of part of the leaf assume lower intensity values compared to the intensity values in the pupil projection images 125 in the area outside the image 350 of part of the leaf. An even lower intensity value is indicated in a leaf vein image 410. The following is a description of a method that may be adopted when calculating pupil projection center positions 425 through pattern matching for the partial area 300 in FIG. 4.

Figure 5:
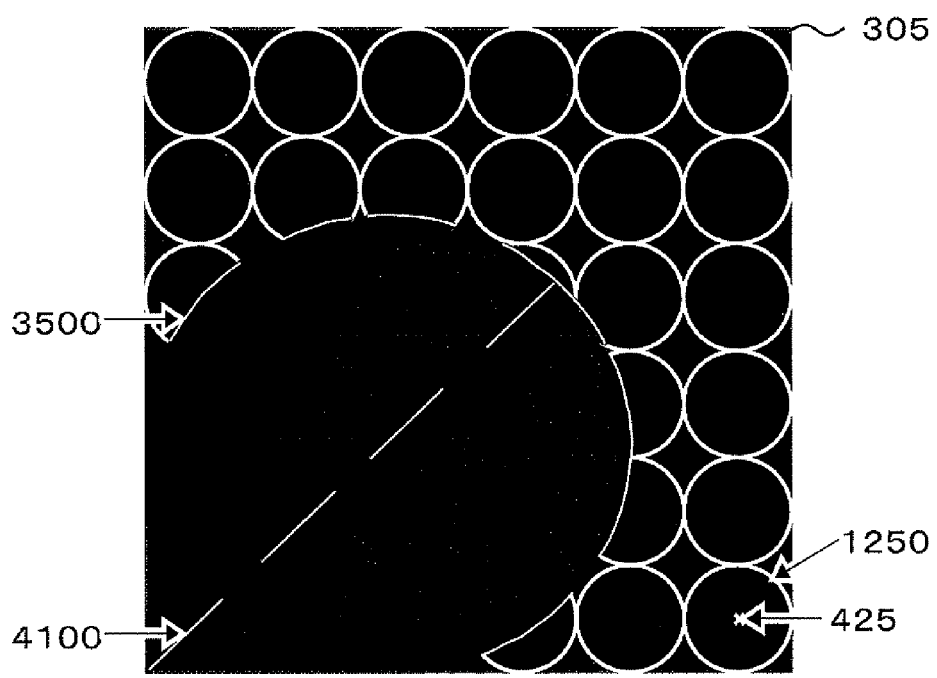
FIG. 5 shows the results that may be obtained by executing edge extraction processing for the image data from the partial area shown in FIG. 4.

FIG. 5 shows the results that may be obtained by executing edge extraction processing for image data generated based upon the output data corresponding to the partial area 300 in FIG. 4, which are included in an image sensor output provided by the image sensor 110. Such edge extraction processing may be achieved through, for instance, a differential filter processing like Laplacian differential filter processing. An edge extraction image 305 in FIG. 5, which is obtained through Laplacian differential filter processing, contains outlines 1250 of the pupil projection images 125 extracted as faint lines. An outline 3500 of the image 350 of part of the leaf, with a lesser extent of variance in the intensity level, is extracted as a slightly darker line. The outline 3500 is indicated with a slightly narrower unfilled line in FIG. 5. No edge is extracted in the area within the image 350 of part of the leaf, except for a line 4100 representing the leaf vein image. This means that the pupil projection images 125 within the subject image area cannot be detected readily.

Figures 6A, 6B, 6C:
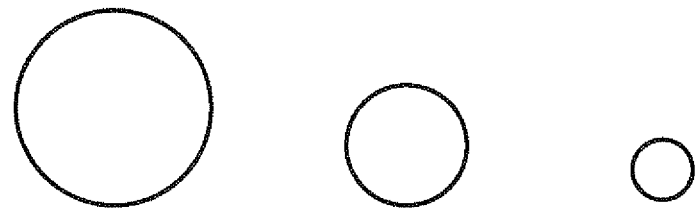
FIGS. 6A, 6B and 6C each show a template image that may be used in pattern matching when calculating pupil projection center positions in FIG. 5.

FIG. 6 shows template images that may be used for purposes of pattern matching when calculating the pupil projection center positions in FIG. 5. FIGS. 6A, 6B and 6C respectively show template images of a large circle, a medium-sized circle and a small circle. In template image-based pattern matching, the partial area 300 in FIG. 5, is scanned in reference to the template image in FIG. 6A, FIG. 6B or FIG. 6C set over the partial area, and a specific pupil projection image 125 matching the template image within the partial area 300 is determined. In more specific terms, the template image is shifted by one pixel position at a time until all the pixel positions within the area 300 are covered, and a correlation value indicating a match factor is calculated at each pixel position. A threshold correlation value is set in advance and whenever a changeover point at which the correlation value having increased to a value large enough to exceed the threshold value starts to decrease, is detected, it is judged that an outline 1250 of a pupil projection image 125 has been detected. Under these circumstances, the pupil projection center position 425 of the particular pupil projection image 125 can be calculated as the position of the center of the circle expressed by the template image aligned with the detected outline 1250. As an alternative, since the outline of a pupil projection image 125 is estimated to be present at the position indicating the highest correlation value, the pupil projection center position 425 in the particular pupil projection image 125 can be calculated based upon the position data indicating the position.

The template images in FIGS. 6A, 6B and 6C are recorded in advance in the internal memory 130, and the specific template image to be used is selected based upon the photographic lens attribute information such as the F number of the photographic lens 160, since the size of the pupil projection images 125, i.e., the pupil diameter, is determined in correspondence to the aperture diameter and the focal length of the photographic lens 160. The photographic lens attribute information is obtained by the main control unit 100 from the photographic lens control unit 150. The correlation value should be calculated through pattern matching processing by adopting, for instance, the technology described as the prior art in Japanese Laid Open Patent Publication No. H9-102039.

The pupil projection center positions 425 must be determined only in correspondence to a predetermined number of sets of sampling data through the pattern matching processing described above, since all the remaining pupil projection center positions 425 can be determined by identifying a specific optimal arithmetic operation expression that will allow the remaining pupil projection center positions to be estimated based upon the pupil projection center positions 425 having been determined in correspondence to the predetermined number of sets of sampling data, as detailed later. In the example presented in FIG. 5, after executing the edge extraction processing, pupil projection center positions 425 may be determined for the predetermined number of sets of sampling data indicating highest correlation values. Such sampling data are highly likely to have been obtained by executing the pattern matching processing described above on data with complete outlines 1250 of pupil projection images 125 extracted without any portions of the outlines missing, and are thus likely to allow pupil projection center positions 425 to be accurately calculated.

As described earlier, the outline 3500 of the image 350 of part of the leaf is extracted as a slightly darker line in FIG. 5. Accordingly, the pattern matching processing described earlier may be executed after exclusively extracting the outlines 1250 of the pupil projection images 125 through, for instance, binarization processing so as to improve the accuracy of the pattern matching processing.

FIG. 7 presents a detailed flowchart of the processing executed by the main control unit 100 in step S210 in the flowcharts in FIGS. 2A and 2B in order to determine the pupil projection center positions. In step S710, an image of the subject is captured by controlling the image sensor 100. In step S715, a photographic image is generated based upon the image sensor output. In step S720, the edge extraction processing described earlier is executed for the photographic image. In step S730, the photographic lens attribute information including the F number of the photographic lens 160 is obtained from the photographic lens control unit 150. This step may be executed before step S710.

In step S740, the optimal template image is selected based upon the photographic lens attribute information, the pattern matching processing is executed in step S750, and then a pupil projection center position 425 is calculated in step S760 based upon the pattern matching results. Until it is decided in step S770 that pupil projection center positions 425 for the predetermined number of sets of sampling data have been obtained, the correlation value is calculated by shifting the template image by, for instance, one pixel position at a time and the processing in step S750 and step S760 is repeatedly executed.

Once the pupil projection center positions 425 are obtained for the predetermined number of sets of sampling data, a specific arithmetic operation expression to be used to calculate pupil projection center positions 425, as described later, is determined in step S780. Then, all the pupil projection center positions 425 are determined by using the determined arithmetic operation expression and the pupil projection center positions having been determined are recorded into the internal memory 130 in step S790 before the main control unit 100 returns to the processing in FIG. 2A or FIG. 2B.

The specific arithmetic operation expression identified in step S780 in FIG. 7 to be used to calculate pupil projection center positions 425 is described. The position $x_i$ of the pixel that receives the light beam entering the center of the ith micro-lens, the position $x_0$ of the pixel that receives the light beam entering the center of the micro-lens located closest to the optical axis of the photographic lens 160, the pupil position h, the micro-lens pitch d and the focal length f of the micro-lenses in FIG. 1 achieve a relationship expressed in (1) below.

$$\frac{x_0 + id}{h} = \frac{x_i}{h+f} \quad (1)$$

Expression (1) can be modified to expression (2)

$$x_i = x_0\left(1 + \frac{f}{h}\right) + d\left(1 + \frac{f}{h}\right)i \quad (2)$$

Figure 8:
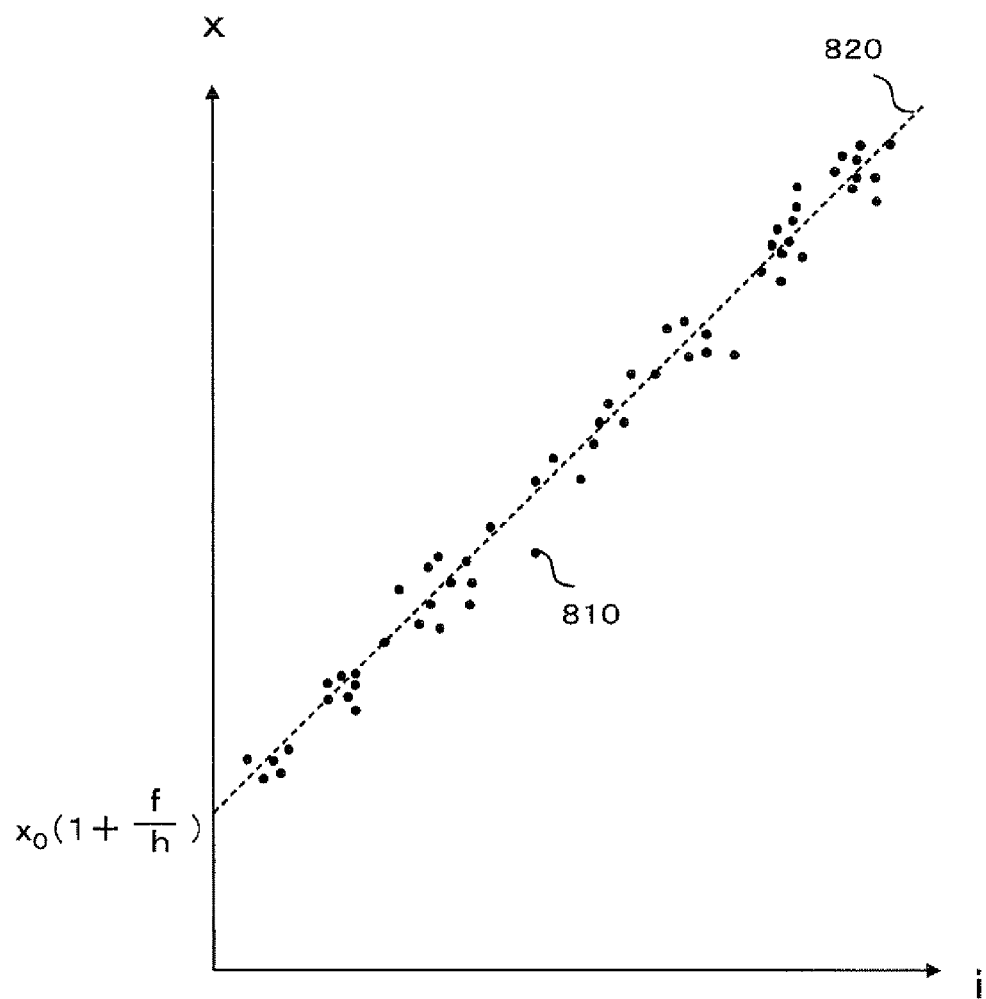
FIG. 8 shows points indicating the pupil projection center positions calculated for the individual sets of sampling data plotted on a plane in a coordinate system defined by an x-axis and an i-axis, and the regression line drawn based upon the plotted points.

The pupil projection center positions 425 having been obtained as described above in conjunction with the predetermined number of sets of sampling data are each equivalent to the position $x_i$, and a graph drawn by plotting the pupil projection center positions $x_i$ having been obtained on a plane in the coordinate system defined by the x-axis and the i-axis should regress to the straight line defined by expression (2). FIG. 8 shows dots 810, indicating the pupil projection center positions $x_i$ calculated in conjunction with the predetermined number of sets of sampling data plotted on the plane in the x-axis/i-axis coordinate system and a dotted line representing a regression line 820 defined in expression (2). The slope d(1+f/h) of the straight line defined in expression (2) can be determined through the method of least squares in expression (3), based upon the differences between the pupil projection center positions $x_i$ having been obtained as described earlier in conjunction with the predetermined number of sets of sampling data and their average and the differences between the ordinal numbers i each indicating the ordinal assigned to a specific micro-lens and the average of the ordinal numbers.

$$d\left(1 + \frac{f}{h}\right) = \frac{\sum (x_i - \bar{x}) \cdot (i - \bar{i})}{\sum (i - \bar{i})^2} \quad (3)$$

Based upon expressions (2) and (3), the x intercept $x_0$(1+ f/h) of the regression line defined in expression (2) can be determined as expressed in (4) below.

$$x_0\left(1 + \frac{f}{h}\right) = \bar{x}_i - d\left(1 + \frac{f}{h}\right) \cdot \bar{i} \quad (4)$$

Since the micro-lens pitch d and the micro-lens focal length f are known design values, the pupil position h can be calculated based upon expression (3). The position $x_o$ can then be determined based upon expression (4). Expression (2), with the constants d, f, h and $x_0$ incorporated therein for substitution, expresses the relationship between a given pupil projection center position $x_i$ and the corresponding ordinal number i. The specific arithmetic operation expression to be used to determine pupil projection center positions 425, is determined in step S780 in FIG. 7 by assuming the known values for the constants d, f, h and $x_0$ for substitution in expression (2).

The camera 1 achieved in the first embodiment described above adopts a structure that allows the pupil projection center positions $x_i$ for the predetermined number of sets of sampling data to be ascertained through pattern matching and all the pupil projection center positions 425 to be calculated as defined in a specific arithmetic operation expression determined as the arithmetic operation expression to be used to calculate the pupil projection center positions by assuming the known values for the constants d, f, h and $x_0$ for substitution in expression (2) based upon the pattern matching results. As a result, the positions of the pixels that receive light beams entering the centers of the individual micro-lenses after passing through the photographic lens can be determined with a high level of precision, leading to an advantage in that the focus detection and the focus adjustment, as well as the synthetic image generation can be executed with better accuracy.

Second Embodiment

In the first embodiment achieved by adopting the image-capturing apparatus according to the present invention in a camera, an optimal template image corresponding to the pupil diameter, among the template images in FIGS. 6A, 6B and 6C recorded in advance in the internal memory 130, is selected in step S740 in FIG. 7. However, it may not be possible to provide any template image options for use in conjunction with the camera. Or, it may not be possible to obtain the photographic lens attribute information in step S730 if a lens barrel 15 without a photographic lens control unit 150 mounted. Under either of these circumstances, an optimal template image corresponding to the pupil diameter will have to be generated in step S740. The second embodiment achieved by adopting the image-capturing apparatus according to the present invention in the camera 1 when no photographic lens attribute information can be obtained in step S730 is now described in reference to FIG. 9.

Figure 9:
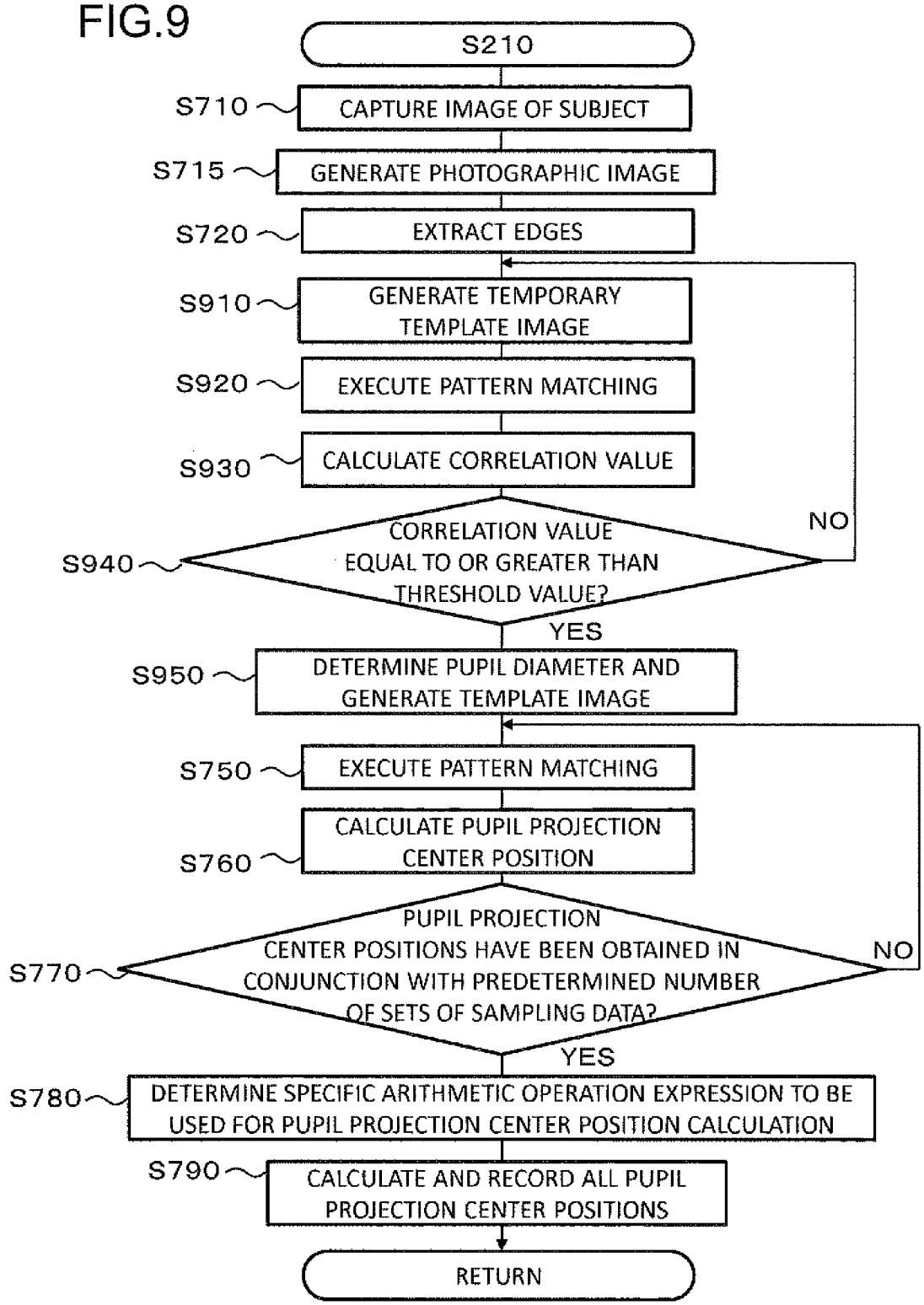
FIG. 9 presents a detailed flowchart of the processing executed by the main control unit in step S210 in FIG. 2A and FIG. 2B, in order to determine the pupil projection center positions in a second embodiment.

FIG. 9 presents a detailed flowchart of processing that may be executed by the main control unit 100 in step S210 in the FIGS. 2A and 2B in order to determine pupil projection center positions. The same step numbers are assigned to steps identical to those in FIG. 7. The following explanation focuses on the processing executed in steps assigned with different step numbers.

Since no photographic lens attribute information has been obtained and an optimal template image corresponding to the pupil diameter cannot be generated, a temporary template is generated in step S910 based upon a predetermined provisional pupil diameter value. In step S920, pattern matching processing similar to that executed in step S750 is executed and the correlation value is calculated in step S930. It can be deemed that an outline 1250 of a pupil projection image 125 has been detected upon detecting, for instance, a changeover point at which the correlation value taking on a value large enough to exceed the threshold value then starts to decrease, and a provisional pupil projection center position in the particular pupil projection image 125 can be thus calculated. Next, a temporary template is generated by adjusting the pupil diameter centered on the provisional pupil projection center position and a correlation value is calculated again. It can be deemed that an outline 1250 of the pupil projection image 125 has been detected upon detecting a changeover point at which the correlation value taking on a value large enough to exceed the threshold value then starts to decrease, and a provisional pupil diameter in the particular pupil projection image 125 can be thus. The processing described above is repeatedly executed until it is decided in step S940 that the correlation value exceeds the predetermined threshold value, before the most likely pupil diameter and pupil projection center position 425 can be determined. In step S950, an optimal template image corresponding to the pupil diameter is generated.

With the camera 1 in the second embodiment as described above, advantages similar to those of the camera 1 in the first embodiment can be achieved even when the photographic lens attribute information cannot be output from the lens barrel 15.

Third Embodiment

In the first embodiment achieved by adopting the image-capturing apparatus according to the present invention in the camera 1, the pupil projection center positions 425 are recorded into the internal memory 130 in step S790 in FIG. 7. Based upon the pupil projection center position data recorded as described above, a pupil projection center position correction quantity may be calculated so as to enable calculation of all the pupil projection center positions 425 even when the pupil position h has changed due to, for example, focus adjustment executed for the photographic lens 160 or due to replacement of the lens barrel 15. In reference to FIG. 10, the third embodiment achieved by adopting the image-capturing apparatus according to the present invention in the camera 1 is described.

Figure 10:
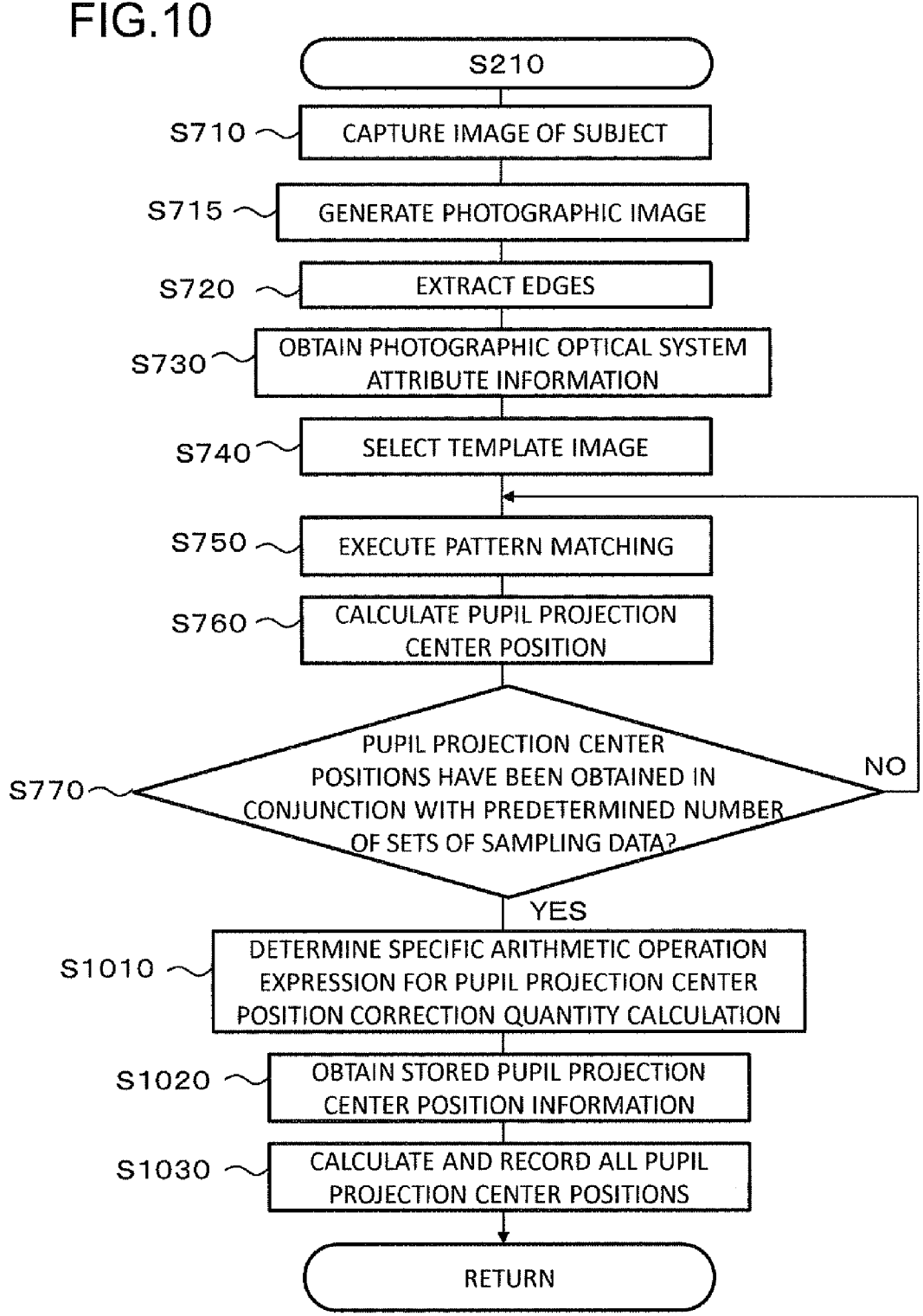
FIG. 10 presents a detailed flowchart of the processing executed by the main control unit in step S210 in FIG. 2A or 2B, in order to determine the pupil projection center positions in a third embodiment.

FIG. 10 presents a detailed flowchart of the processing executed by the main control unit 100 in step S210 in the FIGS. 2A and 2B in order to determine pupil projection center positions. The same step numbers are assigned to steps identical to those in FIG. 7. The following explanation focuses on the processing executed in steps assigned with different step numbers.

In step S1010, a specific arithmetic operation expression to be used to calculate a pupil projection center position quantity as described later, is determined. In step S1020, the reference position that is a pupil projection center position assumed when the pupil position h recorded in the internal memory 130 is equal to $h_0$, is ascertained. In step S1030, all the pupil projection center positions 425 are determined through an arithmetic operation to be detailed later, executed based upon the specific arithmetic operation expression and the reference position, and the pupil projection center positions thus determined are recorded into the internal memory 130.

The specific arithmetic operation expression identified in step S1010 in FIG. 10, which is used to calculate the pupil projection center position correction quantity, is now described. When the pupil projection center position $x_i$ corresponding to the pupil position h in expression (1) is notated as $x_i\{h\}$, pupil projection center position $x_i = x_i\{h_0\}$ is true if pupil position $h = h_0$. The pupil projection center position $x_i\{h_0\}$ is the reference position recorded in the internal memory 130 as explained earlier. In consideration of expression (1), the pupil projection center position correction quantity $\Delta x_i$ can be expressed as in (5) below by using the pupil projection center position $x_i\{h\}$ and the reference position $x_i\{h_0\}$.

$$\Delta x_i = x_i\{h\} - x_i\{h_0\} = \frac{h_0 - h}{h_0 h} \cdot f(x_0 + id) \tag{5}$$

Accordingly, expression (6) can be designated as the specific arithmetic operation expression to be used in step S1030 in FIG. 10 to calculate all the pupil projection center positions 425.

$$x_i\{h\} = x_i\{h_0\} + \Delta x_i = x_i\{h_0\} + \frac{h_0 - h}{h_0 h} \cdot f(x_0 + id) \tag{6}$$

The camera 1 in the third embodiment described above, which does not require pattern matching processing, still achieves advantages similar to those of the camera 1 in the first embodiment, while succeeding in minimizing the volume of arithmetic operation.

Fourth Embodiment

In the first through third embodiments, each achieved by adopting the image-capturing apparatus according to the present invention in the camera 1, the main control unit 100, located in the camera body 10 of the camera 1, which executes focus detection and focus adjustment for the photographic lens 160 or image synthesis, also determines the pupil projection center positions. As an alternative, a PC (personal computer) engaged in operation based upon, for instance, an image analysis computer program, may be assigned to generate the synthetic image and determine the pupil projection center positions by taking in necessary information from the camera 1. In reference to FIGS. 11 and 12, the fourth embodiment achieved by installing the image analysis computer program according to the present invention in a PC is described.

Figure 11:
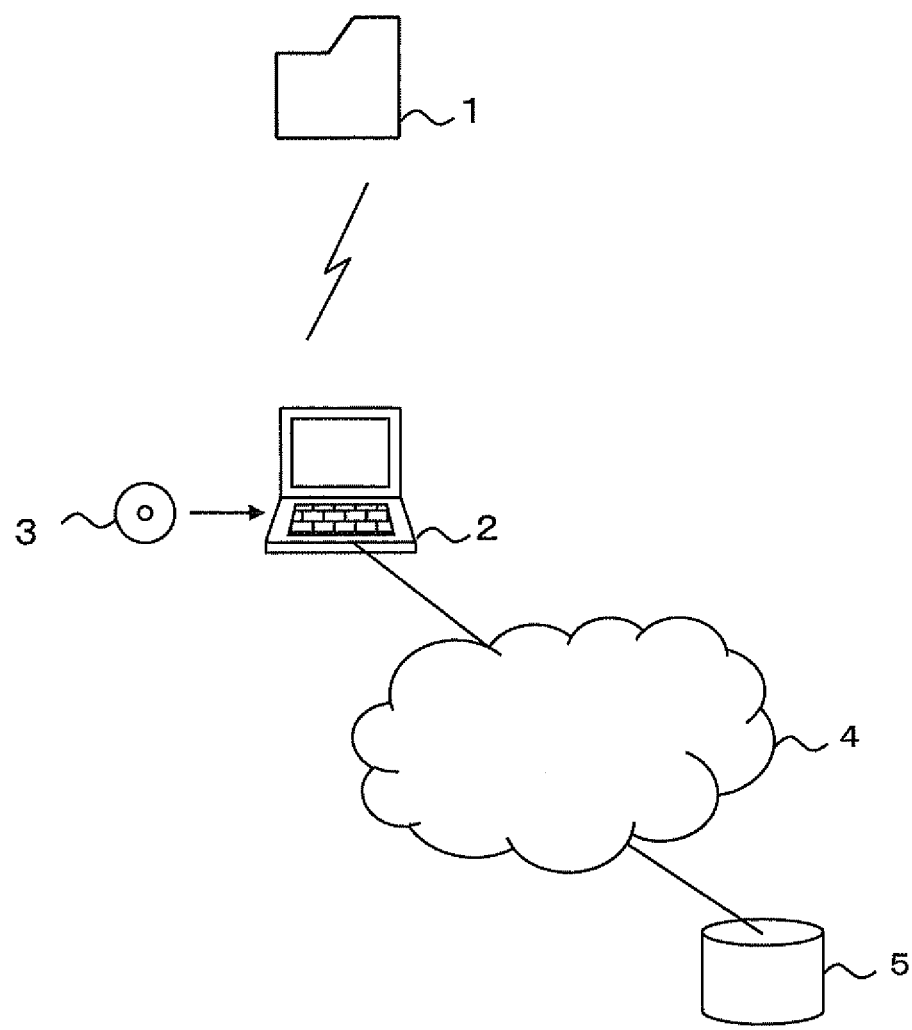
FIG. 11 shows a connection structure adopted in a fourth embodiment to connect the camera with a PC.

FIG. 11 shows a connection structure that may be adopted to achieve a connection for a PC 2 and a camera 1 in the embodiment. The PC 2 and the camera 1 are connected with each other through communication. The mode of connection in this case may be either a wireless connection or a wired connection. The image analysis computer program according to the present invention is installed in the PC 2 via a recording medium 3 such as a CD-ROM. Namely, the image analysis computer program according to the present invention, which enables the PC 2 to execute image analysis including pupil projection center position determination and synthetic image generation, is distributed as a computer program product containing the computer program recorded in the recording medium 3.

Figure 12:
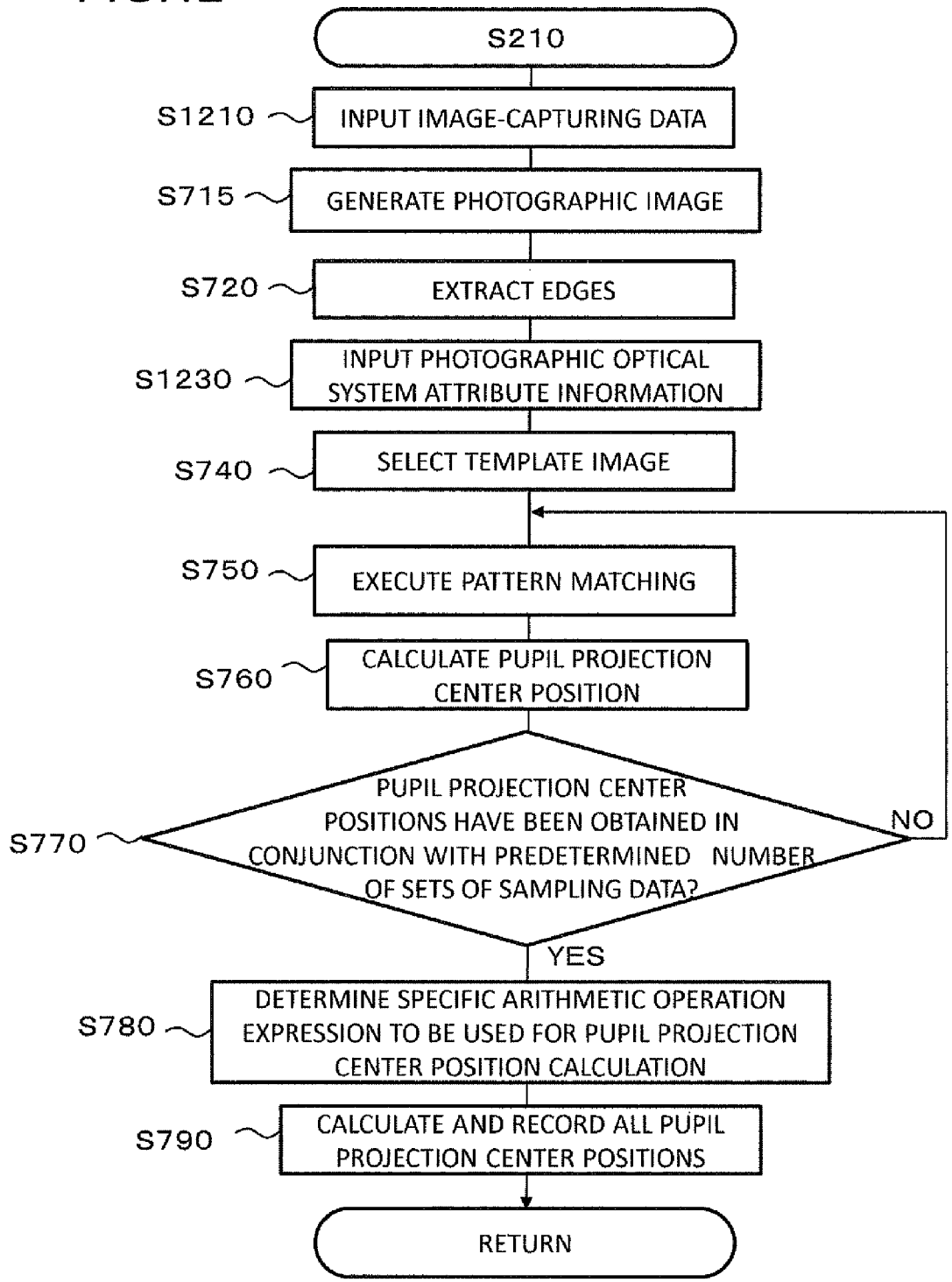
FIG. 12 presents a detailed flowchart of the processing executed by the PC based upon an image analysis computer program in order to determine the pupil center projection in the fourth embodiment.

The PC 2 in the embodiment determines the pupil projection center positions 425 in step S210 in FIG. 2B in accordance with the image analysis computer program and generates a synthetic image in step S230 based upon the pupil projection center positions determined. FIG. 12 presents a detailed flowchart of the processing executed by the PC 2 in the embodiment in accordance with the image analysis computer program, in order to determine the pupil projection center positions. The same step numbers are assigned to steps identical to those in FIG. 7. The following explanation focuses on the processing executed in steps assigned with different step numbers.

In step S1210, image-capturing data generated in the camera 1 are input through communication and, based upon the image-capturing data thus input, a photographic image is generated in step S715. Following the edge extraction executed in step S720, the photographic lens attribute information in the camera 1 is input through communication in step S1230. Subsequently, processing similar to that in FIG. 7 is executed.

In the camera 1 in the fourth embodiment described above, advantages similar to those of the camera 1 in the first embodiment are achieved without diminishing the arithmetic processing performance capability of the main control unit 100 in the camera 1. Furthermore, an even higher level of user convenience is assured since the PC 2 will be capable of more advanced image manipulation processing.

—Variations—

In the first embodiment of the present invention described earlier, the edge extraction processing is achieved through differential filter processing such as Laplacian differential filter processing. When such edge extraction processing is executed using image-capturing data containing a significant high-frequency component, e.g., image-capturing data expressing an image with a finely patterned subject, low pass filter preprocessing may be executed as preprocessing prior to the edge extraction processing.

The computer program product enabling the image analysis including the pupil projection center position determination and the synthetic image generation in the fourth embodiment of the present invention may be provided as a data signal transmitted through a communication network 4 such as the Internet instead of via the recording medium 3, as illustrated in FIG. 11. In order to avail itself of such a computer program product, the PC 2 must be capable of connecting with the communication network 4. A server 5 is a computer that provides the image analysis computer program according to the present invention stored in a storage device such as a hard disk. The server 5 provides the image analysis computer program read out from the storage device as a data signal on a carrier wave, which is then transferred to the PC 2 via the communication network 4. It is preferable that the image analysis computer program according to the present invention be distributed as a computer program product that may assume any of various modes such as the recording medium 3 and the data signal transmitted via the communication network 4.

The embodiments and variations described above may be adopted in any combination. In addition, as long as the functions characterizing the present invention are not compromised, the present invention is in no way limited to any of the specific device structures described in reference to the above embodiments.

The above described embodiments are examples, and various modifications can be made without departing from the scope of the invention.

What is claimed is:

1. An image-capturing apparatus, comprising:
   a micro-lens array that includes a plurality of micro-lenses arrayed therein;
   an image sensor that includes arrayed therein a plurality of pixels that capture a plurality of pupil projection images, each corresponding to a pupil of an optical system projected via one of the plurality of micro-lenses as a light flux from the optical system passes through the micro-lens array;
   a photographic image generation unit that generates, based upon an output from the image sensor, a photographic image including a partial image corresponding to each of the plurality of pupil projection images; and
   an arithmetic operation unit that executes position calculation to determine a center position of the partial image by scanning the photographic image in reference to a reference image corresponding to the partial image.

2. An image-capturing apparatus according to claim 1, wherein:
   the plurality of micro-lenses includes a first micro-lens and a second micro-lens different from the first micro-lens;
   the plurality of pupil projection images includes a first projection image corresponding to the first micro-lens and a second projection image corresponding to the second micro-lens; and
   the arithmetic operation unit determines through the position calculation a first center position of the partial image corresponding to the first projection image and calculates a second center position of the partial image corresponding to the second projection image based upon the first center position and an array arrangement assumed for the plurality of micro-lenses.

3. An image-capturing apparatus according to claim 1, further comprising:
   a selecting unit that selects the reference image based upon attribute information indicating attributes of the optical system.

4. An image-capturing apparatus according to claim 1, further comprising:
   a storage unit in which the center position, calculated by the arithmetic operation unit when a pupil position of the pupil of the optical system takes a predetermined value, is stored as a reference position, wherein:

when the pupil position is altered to assume a value other than the predetermined value, the arithmetic operation unit calculates the center position by using the reference position.

5. An image-capturing apparatus according to claim 4, wherein:
when the pupil position is altered to assume the value other than the predetermined value, the arithmetic operation unit calculates the center position based upon the value other than the predetermined value as well as the predetermined value.

6. An image-capturing apparatus according to claim 1, further comprising:
a image synthesis unit that selects pixels among the plurality of pixels based upon the center position determined through the position calculation and synthesizes a subject image by using outputs from the selected pixels.

7. An image-capturing apparatus according to claim 1, further comprising:
a focus detection unit that selects from the plurality of pixels a pair of pixels corresponding to each of the plurality of micro-lenses, at which a pair of images are formed with a pair of light fluxes passing through a pair of pupils of the optical system different from each other, based upon the center position determined through the position calculation, and detects a focusing condition for the optical system based upon outputs from the pair of pixels.

8. An image-capturing apparatus according to claim 1, further comprising:
a reference image generation unit that updates, based upon a correlation of the reference image and the photographic image manifesting when a pupil diameter in each of the plurality of pupil projection images corresponding to the attribute information is represented by a provisional value, the pupil diameter with an update value, and generates the reference image in correspondence to the pupil diameter assuming the update value.

9. A non-transitory computer-readable computer program product containing an image analysis computer program that enables, in an image-capturing apparatus comprising an optical system, a micro-lens array with a plurality of micro-lenses arrayed therein, and an image sensor with a plurality of pixels arrayed therein, image analysis to be executed in conjunction with image-capturing data generated based upon output from the image sensor, the image analysis computer program comprising:
a generation instruction for generating, based upon the image-capturing data, a photographic image including a partial image corresponding to each of a plurality of pupil projection images each corresponding to a pupil of the optical system; and
a first arithmetic operation instruction for determining a center position of the partial image by scanning the photographic image in reference to a reference image corresponding to the partial image.

10. A non-transitory computer-readable computer program product according to claim 9, wherein the image analysis computer program further comprises:
a second arithmetic operation instruction for calculating, after a first center position of the partial image corresponding to one pupil projection image among the plurality of pupil projection images is determined in response to the first arithmetic operation instruction, a second center position of the partial image corresponding to another pupil projection image among the plurality of pupil projection images based upon the first center position and an array arrangement assumed for the plurality of micro-lenses.

* * * * *